United States Patent
Yoo

[19]

[11] Patent Number: 6,047,049
[45] Date of Patent: Apr. 4, 2000

[54] MULTI-FUNCTION AUDIO SYSTEM AND METHOD FOR CONTROLLING THE SAME

[75] Inventor: Gong Huyn Yoo, Kyunggi-do, Rep. of Korea

[73] Assignee: Costel Electronics Co., Ltd., Rep. of Korea

[21] Appl. No.: 09/016,727

[22] Filed: Feb. 2, 1998

[30] Foreign Application Priority Data

Oct. 31, 1997 [KR] Rep. of Korea ..................... 97-57414

[51] Int. Cl.[7] .................................................. H04M 11/00
[52] U.S. Cl. ............................. 379/102.03; 379/102.92; 379/110.01
[58] Field of Search ................... 379/102.01, 102.02, 379/102.03, 90.01, 93.05, 93.01, 110.01, 159, 162

[56] References Cited

U.S. PATENT DOCUMENTS

D. 279,900  7/1985  Topp ................................. 379/110.01
5,315,644  5/1994  Lester et al. ...................... 379/102.07
5,870,453  2/1999  Shapiro ............................. 379/102.03

FOREIGN PATENT DOCUMENTS 409205482A  8/1997  Japan .............................. H04M 1/65

*Primary Examiner*—Paul Loomis
*Assistant Examiner*—Melur Ramakrishnaiah
*Attorney, Agent, or Firm*—Nathan N. Kallman

[57] ABSTRACT

The audio system attachable to furniture located in a kitchen, living room, bed room or office is disclosed. The system includes the digital clock, audio, telephone, interphone, voice recording, indoor broadcasting and air cleaning functions. Accordingly, the user can relieve the tedium of housekeeping labor by listening to the audio system, and make the telephone call and interphone call while at work without moving to the telephone and interphone. The user can directly record the telephone conversation while he or she is on the phone, and record a voice message to be transmitted to the family when he or she goes out. The user can call the family in the house using the indoor broadcasting function. It is possible to rapidly effectively clean the polluted air and the various smell generated in the kitchen.

13 Claims, 9 Drawing Sheets

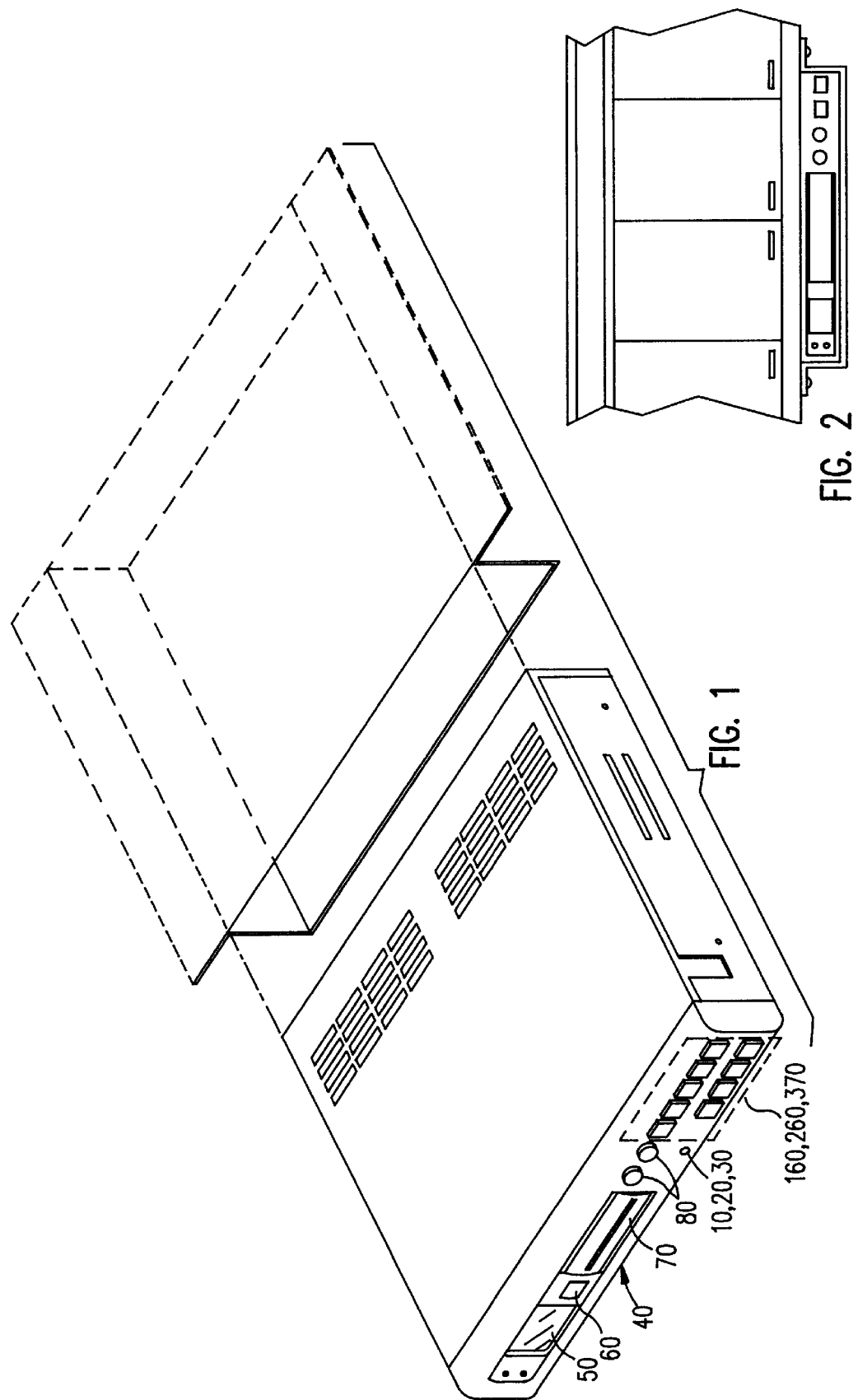

MULTI-FUNCTION AUDIO SYSTEM AND METHOD FOR CONTROLLING THE SAME

BACKGROUND OF THE INVENTION

1. Field of the Invention

The present invention relates to an audio system attachable to furniture located in a kitchen, living room, bed room or office, specifically, to a multi-function audio system having various functions in addition to audio function.

2. Discussion of Related Art

Housewives spend a lot of time in the kitchen. They do not much care the quality of the kitchen, that is, convenience of using a sink and other kitchen utensils in the former days. However, as a living standard rises, a variety of electronic appliances for kitchen have been developed, which are useful for decorating the kitchen and helping a user to work. As an electronic appliance for kitchen, there has been a small-size audio system which is easily attachable to an extra space of a sink of kitchen furniture (furniture of a living room, bed room or office may be included), to relieve the tedium of simply repeated housekeeping labor and to easily obtain various information.

This small-size audio system generally includes a radio set for hearing AM/FM broadcast, and a digital clock, to allow a user to listen to the radio and to know the current time. However, the conventional audio system has only function of radio and digital clock. For example, when the telephone rings while a person is in the kitchen, he or she has to stop the work, go to the phone and answer the phone, holding the handset. Furthermore, when a message is needed to be recorded, he or she has to write it with paper and pen. In this case, if his or her hands are wet or stained with food, he or she should clean the hands and write the message. Moreover, when the interphone rings while the person is in the kitchen, he or she has to go to the interphone and confirm the guest. These are all bothersome jobs.

SUMMARY OF THE INVENTION

An object of the present invention is to provide a multi-function audio system attachable to furniture, which includes telephone, telephone call message recording and voice message recording functions.

Another object of the present invention is to provide a multi-function audio system attachable to furniture, which further includes interphone (for house), air cleaning and indoor broadcasting functions.

To accomplish the objects of the present invention, there is provided a method for controlling a multi-function audio system, including: a ring signal outputting step of muting an audio signal when a ring signal is detected from an office line, and outputting the ring signal to a speaker; a telephone call connecting step of connecting a telephone call when a user wants to speak, after the ring signal is outputted; and a telephone call completing step of completing the connection of telephone call, and releasing the mute state of the audio signal, when the user wants to finish the call.

The method further includes a telephone conversation recording step of recording a telephone conversation when the user wants to record the telephone conversation during the telephone connecting step; a voice message recording step of recording a user's voice message; and a playback step of reading and playing back the recorded one when the user wants to play back it.

To accomplish the objects of the present invention, there is provided a multi-function audio system including: a digital clock which has an alarm function, and displays the current time; an audio circuit for outputting the current audio signal to a speaker, according to a switching state of a switching section; a speaking circuit for outputting a ring signal through the speaker according to a switching state of the switching section under the control of a controlling section, and connecting a telephone call when a user wants to speak; a voice storing section for storing a telephone conversation and voice message under the control of the controlling section, and outputting the stored one when the user wants to play back it; the switching section for varying its switching state under the control of the controlling section, to supply the output of the audio circuit, speaking circuit and voice storing section to the speaker; a ring signal detecting section for detecting the ring signal supplied from the speaking circuit; and the controlling section for receiving the signal detected by the ring signal detecting section, controlling the switching of the switching section to output the ring signal applied from the speaking circuit to the speaker, and controlling the switching state of the switching section according to a key command supplied from a key input section.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1 illustrates an example of the exterior of an audio system according to the present invention;

FIG. 2 illustrates an example of setting of tie audio system according to the present invention;

DETAILED DESCRIPTION OF PREFERRED EMBODIMENT

Figure 3:
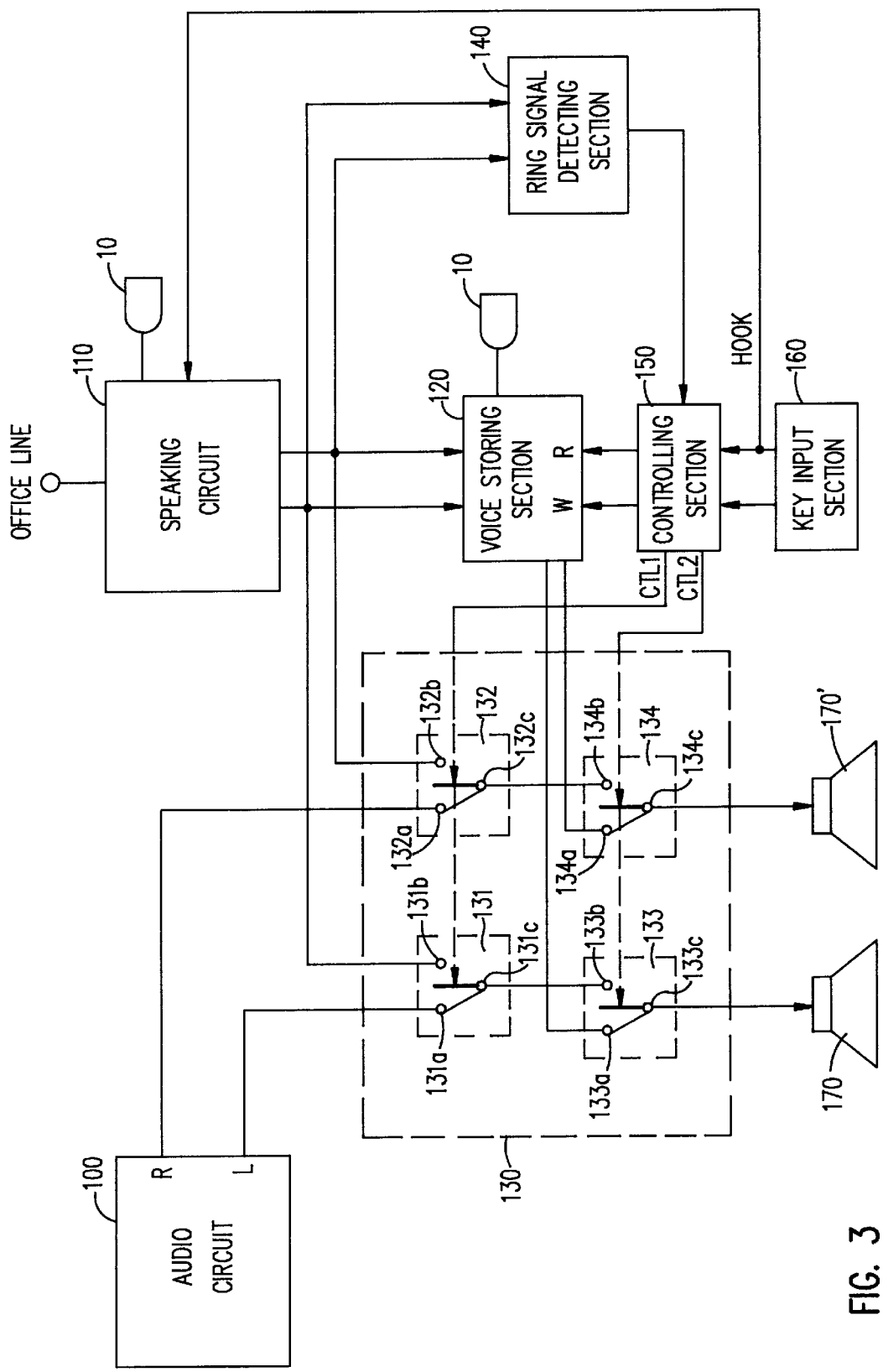
FIG. 3 is a block diagram of a circuit according to an embodiment of the present invention.
Figure 4:
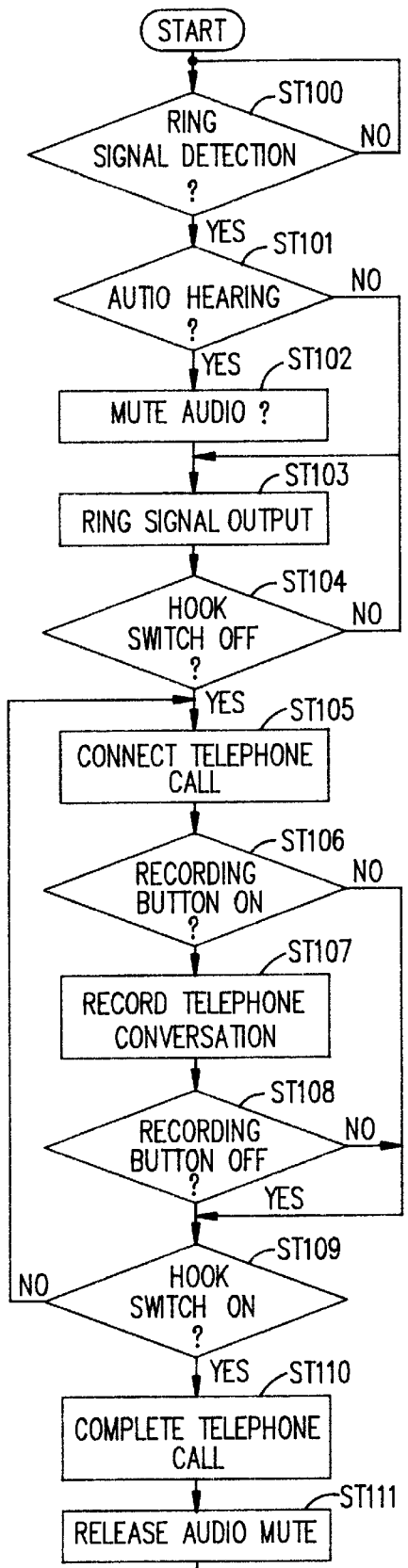
FIGS. 4, 5 and 6 are flow diagrams for explaining the operation of the circuit of FIG. 3.
Figure 5:
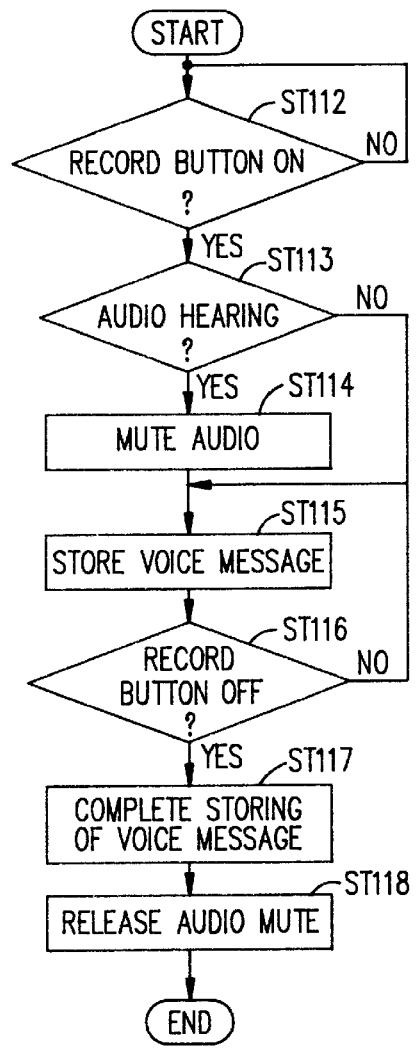
Figure 6:
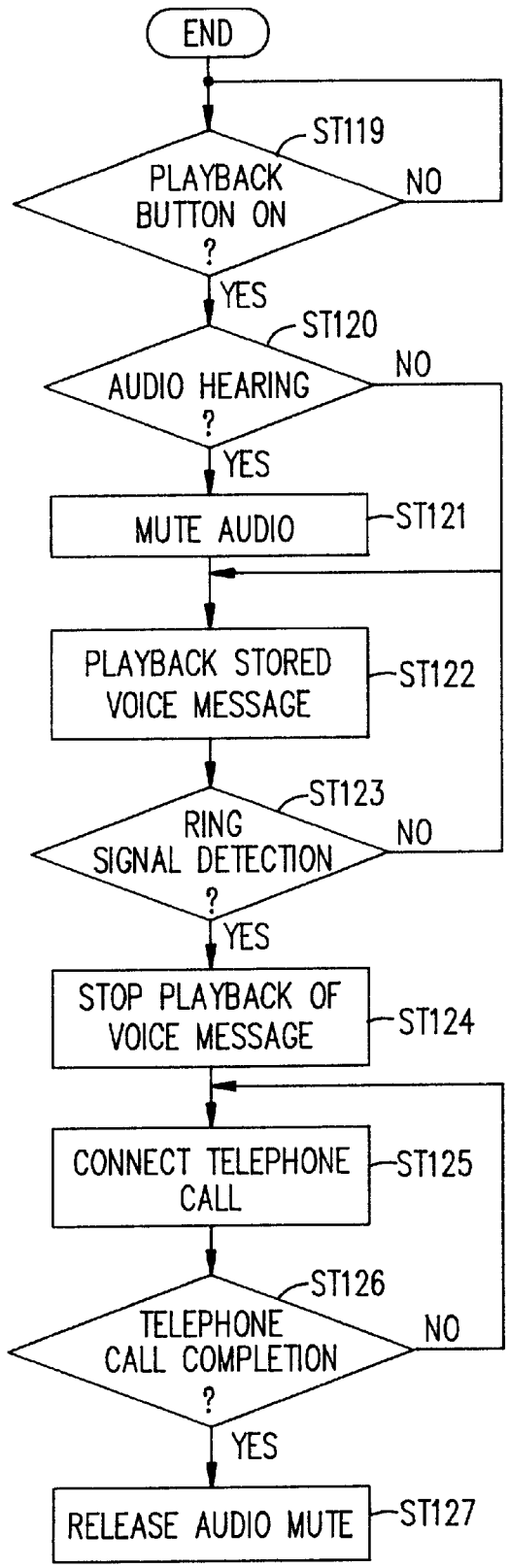

Reference will now be made in detail to the preferred embodiments of the present invention, examples of which are illustrated in the accompanying drawings.

FIG. 1 illustrates an example of the exterior of an audio system according to the present invention. Referring to FIG. 1, the audio system includes a time displaying section 50 for Displaying time or a front panel 40, a tuning frequency displaying section 70 for displaying tuning frequencies of a radio, control knobs 80 for choosing a radio station and controlling the volume of voice through a speaker, a microphone 10, 20 and 30 for inputting a telephone call and voice message, and key input sections 160, 260 and 370 for applying an operation command to each of the components of the system.

FIG. 2 illustrates an example of setting of the audio system according to the present invention. As shown in FIG. 2, the audio system of the present invention is directly attached to the bottom of panel of furniture such as kitchen unit, or set to the panel using an attachment.

The audio system and method for controlling the same according to the present invention is explained below in detail with reference to the attached drawings. The audio system controlling method according to the present invention includes a ring signal outputting step ST100, ST101, ST102 and ST103, a telephone call connecting step ST104, ST105 and ST109, a telephone conversation recording step ST106, ST107 and ST108, a call completing step ST110 and ST111, a voice message recording step ST112, ST113, ST114, ST115, ST116, ST117 and ST118, and a playback step ST119, ST120, ST121, ST122, ST123, ST124, ST125, ST126 and ST127.

Ring signal outputting step ST100, ST101, ST102 and ST103, in which a ring signal is outputted to a speaker when the phone rings while a user is listening to the audio system, includes a first step (ST100) of detecting a ring signal of a telephone system, a second step (S101) of judging if the user is listening to the audio system when the ring signal is detected at the first step, and a third step (ST102, ST103) of muting the audio system and outputting the ring signal to the speaker when it is judged that the user is listening to the audio system at the second step.

Telephone connecting step ST104, ST105 and ST109 is for connecting the telephone call to a caller when the user wants to call, that is, the hook switch is off. Telephone conversation recording step ST106, ST107 and ST108, in which the telephone conversation is recorded while the user is on the phone, includes a first step (ST106) of judging if a recording button is pressed while the user is on the phone, and a second step (ST107, ST108) of recording the telephone conversation when the recording button is pressed, until the recording button is off.

Call completing step ST110 and ST111, for completing the call when the user finishes it, that is, the hook switch is on, includes a first step (ST109) of judging if the hook switch is on, and a second step (ST110, ST111) of completing the call and releasing the mute state of the audio signal when the hook switch is on at the first step.

Voice message recording step ST112, ST113, ST114, ST115, ST116 and ST117, for storing a user's voice message, includes a first step (ST112, ST113) of judging if the user is listening to the audio system when a voice message recording button is pushed by the user, a second step (ST114, ST115) of muting the audio and storing the voice message when the user is listening to the audio, and a third step (ST116, ST117, ST118) of completing the storing of the voice message, and then releasing the mute state of the audio when the voice message recording button is off during the second step.

Playback step ST119, ST120, ST121, ST122, ST123, ST124, ST125, ST126 and ST127, for playing back the recorded telephone conversation and voice message, includes a first step (ST119, ST120) of judging if the user is listening to the audio when a playback button is pressed, a second step (ST121, ST122) of muting the audio system and playing back the stored voice message when the user is listening to the audio, a third step (ST123, ST124, ST125) of stopping the playback of the voice message when the ring signal is detected during the second step and connecting the telephone call, and fourth step (ST126, ST127) of releasing the mute state and repeating the first to fourth steps when the call is completed.

The multi-function audio system of the present invention is composed of a digital clock (not shown), audio circuit 100, speaking circuit 110, voice storing section 120, switching section 130, ring signal detecting section 140 and controlling section 150. Audio circuit 100 includes a radio receiver, cassette and compact disk (CD) player. Speaking circuit 110 outputs a ring signal received from an office line, and connects a call when the hook switch of a key input section 160 is off by the user. Voice storing section 120 stores a voice message from the user and telephone conversation from speaking circuit 110.

Switching section 130 receives the output of audio circuit 100, speaking circuit 110 and voice storing section 120 under the control of controlling section 150, and selectively applies the output to speakers 170 and 170'. Ring signal detecting section 140 detects the ring signal applied from speaking circuit 110 and sends it to controlling section 150. Controlling section 150 controls switching section 130 to apply the output of speaking circuit 110 to speakers 170 and 170' when the ring signal is detected by ring signal detecting section 140, and to selectively apply the output of audio circuit 100, speaking circuit 110 and voice storing section 120 to speakers 170 and 170' according to a key input of key input section 160.

The multi-function audio system and method for controlling the same according to the present invention is explained below in detail with reference to FIGS. 3 to 6. The explanation about the digital clock and alarm functions is omitted because they are very general. The digital clock is roughly illustrated in FIG. 1.

A left output L from audio circuit 100 is coupled to a fixed contact point 131a of a first switch 131 of switching section 130, its right output R is coupled to a fixed contact point 132a of second switch 132. The output of speaking circuit 110 is connected to fixed contact points 131b and 132b of first and second switches 131 and 132 of switching section 130, and variable contact points 131c and 132c of first and second switches 131 and 132 are selectively connected to fixed contact points 131a, 131b, 132a and 132b according to a control signal CTL1 supplied from controlling section 150.

The output of voice storing section 120 is connected to fixed contact points 133a and 134a of third and fourth switches 133 and 134 of switching section 130, and their fixed contact points 133b and 134b are respectively connected to variable contact points 131c and 132c of first second switches 131 and 132. Variable contact points 133c and 134c of third and fourth switches 133 and 134 are respectively connected to left and right speakers 170 and 170', and selectively connected to fixed contact points 133a, 133b, 134a and 134b according to a control signal CTL2 supplied from controlling section 150.

Under the connection of switching section 130 as above, when variable contact point 131c of first switch 131 is coupled to its fixed contact point 131a, variable contact point 132c of second switch 132 is coupled to its fixed contact point 132a, variable contact point 133c of third switch 133 is coupled to its fixed contact point 133b, and variable contact point 134c of fourth switch 134 is coupled to its fixed contact point 134a, left output L and right output R of audio circuit 100 are outputted through left and right speakers 170 and 170' according to the above-described contact point connection state of switching section 130. This contact point connection state is maintained in normal condition, to give priority to the output of audio circuit 100.

When the phone rings while the user is listening to the sound through audio circuit 100, speaking circuit 110 receives the ring signal and outputs it. Ring signal detecting section 140 detects the ring signal and sends a signal corresponding to the ring signal to controlling section 150. Controlling section 150, when the ring signal is received from ring signal detecting section 140, outputs control signal CTL1 to switch the contact point connection state, so as to connect variable contact point 131c of first switch 131 of switching section 130 to its fixed contact point 131b, and to connect variable contact point 132c of second switch 132 to its fixed contact point 132b. Here, it is maintained that variable contact point 133c of third switch 133 is connected to its fixed contact point 133b, and variable contact point 134c of fourth switch 134 is connected to its fixed contact point 134b.

By doing so, the output of audio circuit 100 is temporarily in mute state according to the switching of first and second switches 131 and 132, and the ring signal applied from speaking circuit 110 is sent to speakers 170 and 170' through switching section 130 (ST100, ST101, ST102, ST103). When the user applies a key command through key input section 160 to simultaneously hear the outputs of audio circuit 100 and speaking circuit 110, controlling section 150 receives the key command and outputs control signal CTL1, to connect variable contact point 131c of first switch 131 of switching section 130 to its fixed contact point 131a, thereby outputting the audio signal of audio circuit 100 to left speaker 170 and outputting the telephone voice to right speaker 170'.

When the user hears the ring signal and makes the hook switch of key input section 160 off to answer the phone, the telephone call is connected to a caller, to allow the user to speak through speakers 170 and 170' and microphone 10 (ST104, ST105 ). After this, when the user makes the hook switch on in order to finish the call, controlling section 150 outputs control signal CTL1 to control the contact point connection state of the switching section, so as to connect variable contact points 131c and 132c of first and second switches 131 and 132 of switching section 130 to their fixed contact points 131a and 132a, respectively. That is, the mute state of audio circuit 100 is released. Accordingly, the user can continuously listen to the audio signal of audio circuit 100, previously being heard, after finishing the call (ST109, ST110, ST111).

Meanwhile, when the user pushes the recording button of key input section 160 to record an important message (for example, telephone number, address, appointed place and time, etc.) while he or she is on the phone, controlling section 150 responds to this, applying a recording command W to voice storing section 120. Then, voice storing section 120 receives the telephone conversation from speaking circuit 110 and stores it (ST106, ST107). The telephone voice from speaking circuit 110 is outputted through speakers 170 and 170'. When the hook switch is on, the recording is completed even if the user does not make the recording button off, and the call is finished as described above (ST108, ST109).

When the user pushes a message recording button of key input section 160 in order to leave a message to the family when he or she goes out, or temporarily record a specific message to be memorized (ST112), controlling section 150 applies recording command W to voice storing section 120. According to this, voice storing section 120 receives the message applied through microphone 10, and records it in its inner storage (ST115). Here, controlling section 150 generates a control signal CTL2 to connect variable contact points 133c and 134c of third and fourth switches 133 and 134 of switching section 130 to their fixed contact points 133a and 134a respectively, so as not to mix the user's voice with the output of audio circuit 100 when the voice message is stored. However, since the output of voice storing section 120 is not generated by the control of controlling section 150, the output of audio circuit 100 becomes mute state (ST113, ST114).

When the user makes the recording button off to finish the storing of voice message, controlling section 150 generates control signal CRL2 to connect variable contact points 133c and 134c of third and fourth switches 133 and 134 of switching section 130 to their fixed contact points 133a and 134a respectively, thereby releasing the mute state (ST116, ST117, ST118). A magnetic tape or memory chip can be used as the storage medium of voice storing section 120.

When the user pushes a playback button of key input section 160 to play back the recorded telephone conversation or voice message, controlling section 150 applies a playback command R to voice storing section 120. Then, voice storing section 120 outputs the stored telephone conversation or voice message to fixed contact points 133a and 134a of third and fourth switches 133 and 134 of switching section 130. Here, controlling section 150 generates control signal CTL2 to respectively connect variable contact points 133c and 134c of third and fourth switches 133 and 134 of switching section 130 to their fixed contact points 133a and 134a connecting to voice storing section 120. By doing so, the voice message stored in voice storing section 120 is outputted through speakers 170 and 170', and output of audio circuit 100 becomes mute (ST119, ST120, ST121, ST122).

When the ring signal is applied from speaking circuit 110 while the telephone conversation or voice message stored in voice storing section 120 is played back, ring signal detecting section 140 detects the ring signal and sends it to controlling section 150 (ST123). Controlling section 150 controls to connect variable contact point 131c of first switch 131 to its fixed contact point 131b in order to give priority to telephone call, and generates control signal CTL1 to connect variable contact point 132c of second switch 132 to its fixed contact point 132b. Furthermore, controlling section 150 generates control signal CTL2 to connect variable contact point 133c of third switch 133 to its fixed contact point 133b, and to connect variable contact point 134c of fourth switch 134 to its fixed contact point 134b. Accordingly, the playback of the voice message stored in voice storing section 120 is completed, and telephone call is connected.

When the user makes the hook switch on through key input section 160 to finish the telephone call, controlling section 150 generates control signal CTL1 to connect variable contact point 131c of first switch 131 of switching section 130 to its fixed contact point 131a, and to connect variable contact point 132c of second switch 132 to its fixed contact point 132a. Furthermore, controlling section 150 generates control signal CTL2 to connect variable contact point 133c of third switch 133 to its fixed contact point 133a, and to connect variable contact point 134c of fourth switch 134 to its fixed contact point 134a, thereby releasing the mute state of audio circuit 100 (ST126, ST127).

A method for controlling the multi-function audio system according to another embodiment of the present invention includes: a ring signal outputting step of, when a ring signal is received from an office line, muting an audio signal and outputting the ring signal to a speaker; a telephone call connecting step of connecting the telephone when a user wants to call after the ring signal is outputted; a telephone call holding step of holding the telephone call when a call holding button is pushed after an interphone's call sound is generated during the telephone call connecting step; a call switching step of connecting an interphone call when the telephone call is held, and connecting the telephone call again when the interphone call is completed; and a telephone call completing step of finishing the telephone call and releasing the mute stat of the audio signal when the user wants to finish the telephone call.

The method further includes: a simultaneous connecting step of simultaneously connecting the telephone and interphone calls when the user wants to use the interphone without pushing the call holding button after the interphone call sound is generated during the telephone call connecting step; and an interphone call completing step of switching the telephone on, and performing the telephone call completing step, when the interphone call is finished.

Figure 7:
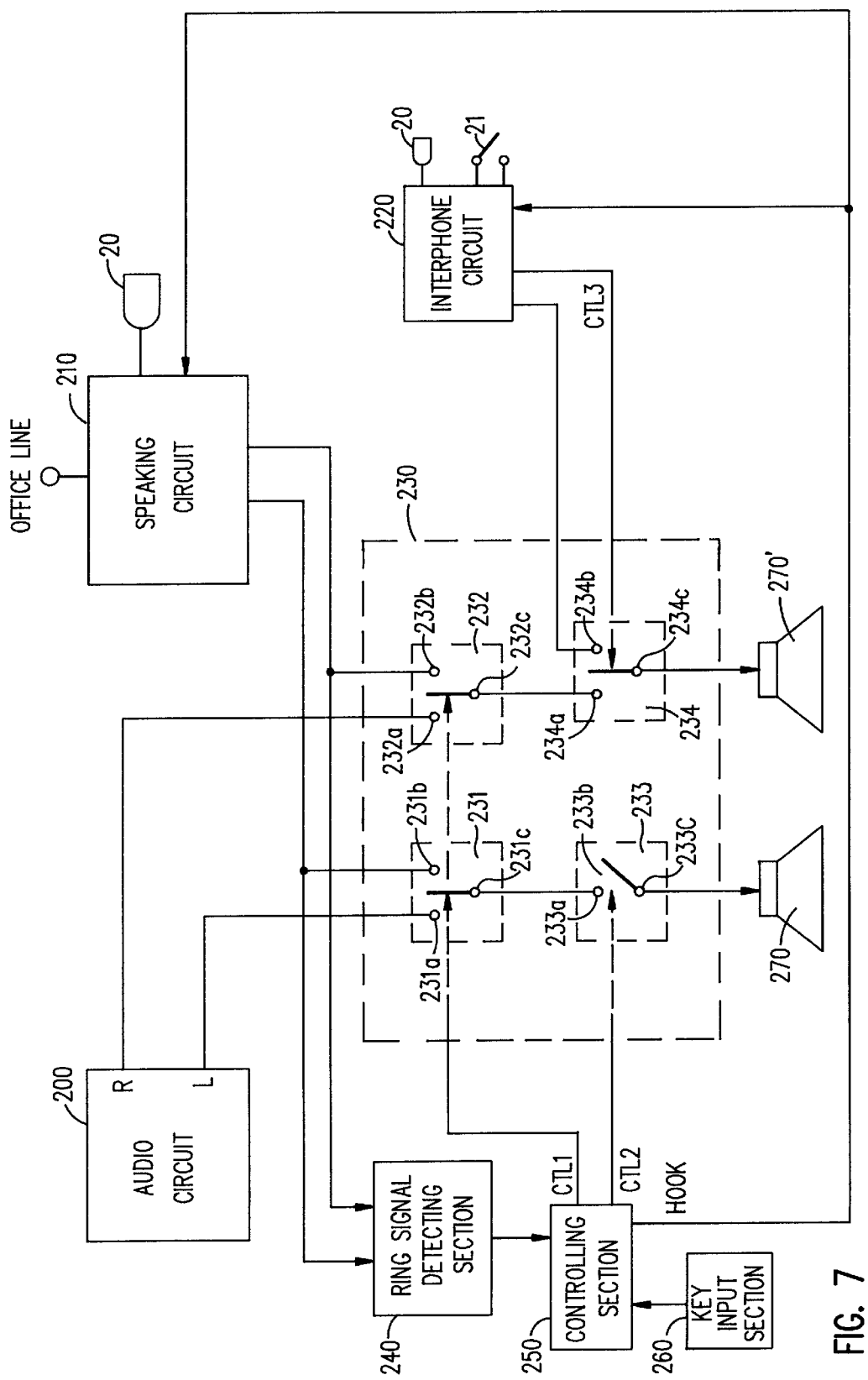
FIG. 7 is a block diagram of a circuit according to another embodiment of the present invention.

A multi-function audio system according to another embodiment of the present invention, as shown in FIG. 7, includes: a digital clock which has an alarm function and displays the current time; an audio circuit 200 for outputting the current audio signal to speakers 270 and 270' according to the switching state of a switching section 230; a speaking circuit 210 for outputting a ring signal through speakers 270 and 270' according to the switching state of switching section 230 under the control of a controlling section 250, and connecting the telephone call to a caller when the user wants to speak; an interphone circuit 220 for controlling the switching state of switching section 230 to output a bell signal through speaker 270' when a call button 21 of the interphone is pushed, and connecting the interphone call to a caller when the user wants to speak; switching section 230 for varying its switching state according to the control of controlling section 250 to apply the output of audio circuit 200, speaking circuit 210 and interphone circuit 220 to speakers 270 and 270'; a ring signal detecting section 240 for detecting the ring signal supplied from speaking circuit 210; and controlling section 250 for receiving the signal detected by ring signal detecting section 240, controlling the switching of switching section 230 to output the ring signal applied from speaking circuit 210 to speakers 270 and 270', and controlling the switching state of switching section 230 according to a key command supplied from a key input section 260.

The multi-function audio system and method for controlling the same according to the present invention is explained below in detail with reference to the accompanying drawings. The audio system controlling method of the present invention includes a ring signal outputting step ST200, ST201, ST202 and ST203, a telephone call connecting step ST204 and ST205, a telephone call holding step ST206, ST207, ST208 and ST209, a call switching step ST210, ST211, ST212 and ST213, a simultaneous connecting step ST214 and ST215, an interphone call completing step ST216, and a telephone call completing step ST217 and ST218.

Ring signal outputting step (ST200, ST201, ST202, ST203), for outputting a ring signal when the telephone rings while the user is listening to the audio system, includes a first step ST200 of detecting the ring signal of the telephone system, a second step ST201 of judging if the user is listening to the audio system when the ring signal is detected at the first step, and a third step of muting the audio signal and outputting the ring signal to a speaker when it is judged that the user is hearing the audio system. Telephone call connecting step (ST204, ST205) is for connecting the telephone to a caller when the user wants to call, that is, the hook switch is off.

Telephone holding step (ST206, ST207, ST208, ST209), for holding the telephone call when an interphone's call sound is generated, includes a first step ST206 of judging if a call button of the interphone is pressed, a second step ST207 and ST208 of judging if the call sound is generated and telephone call holding button is pushed when the call button of the interphone is pressed, and a third step ST209 of holding the telephone call when the telephone call holding button is pushed.

Call switching step (ST210, ST211, ST212, ST213), for connecting the interphone call while the telephone call is being held, includes a first step ST210 and ST211 of connecting the interphone call when the interphone hook switch is off, and a second step ST212 and ST213 of cancelling the holding state of the telephone call when the interphone hook switch is on during the interphone call. Simultaneous connecting step ST214 and ST215 is for connecting the user to telephone and interphone calls simultaneously when only interphone hook switch is on when the telephone call holding button is not pressed. Interphone call completing step ST216 is for connecting the telephone call when the interphone call is completed. Telephone call completing step ST217 and ST218 is for completing the telephone call and releasing the mute stat of the audio signal when the telephone hook switch is on.

A multi-function audio system according to another embodiment of the present invention includes a digital clock (not shown), audio circuit 200, speaking circuit 210, interphone circuit 220, switching section 230, ring signal detecting section 240 and controlling section 250. Audio circuit 200 includes a radio receiver, cassette, and CD player. Speaking circuit 210 outputs a ring signal received through an office line, and connects the telephone to a caller when the user makes the hook switch of key input section 260 on. Interphone circuit 220 connects the call between inside of and outside (for example, the entrance) of a house.

Switching section 230 receives the output of audio circuit 200, speaking circuit 210 and interphone circuit 220 and selectively applies it to speakers 270 and 270' under the control of controlling section 250. Ring signal detecting section 240 detects the ring signal supplied from speaking circuit 210, and sends it to controlling section 250. Controlling section 250 controls switching section 230 to apply the output of speaking circuit 210 to speakers 270 and 270' when the ring signal is detected by ring signal detecting section 240, and to selectively apply the output of audio circuit 200, speaking circuit 210 and interphone circuit 220 to speakers 270 and 270'.

Figure 8:
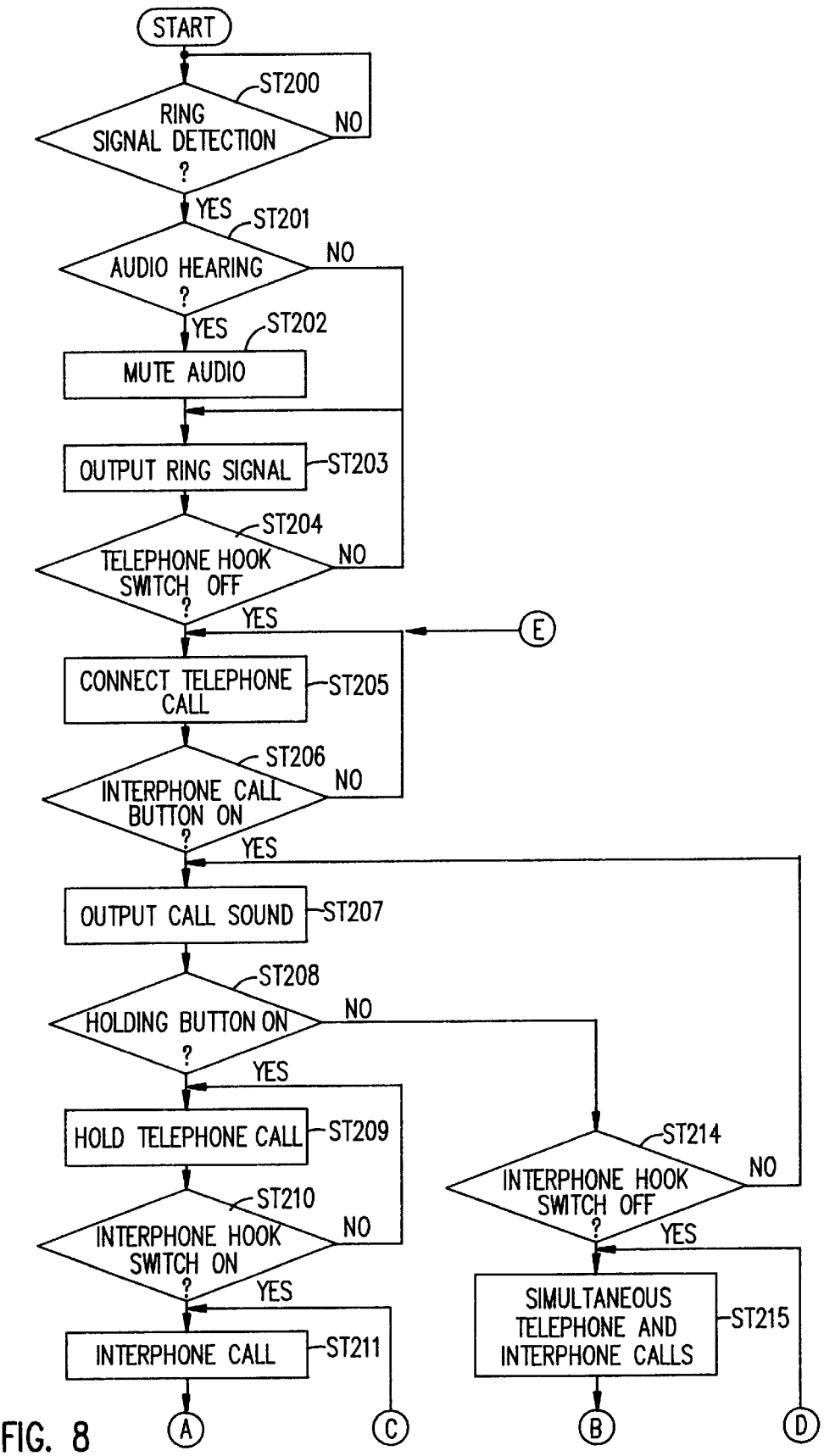
FIGS. 8 and 9 are flow diagrams for explaining the operation of the circuit of FIG. 7.
Figure 8A:
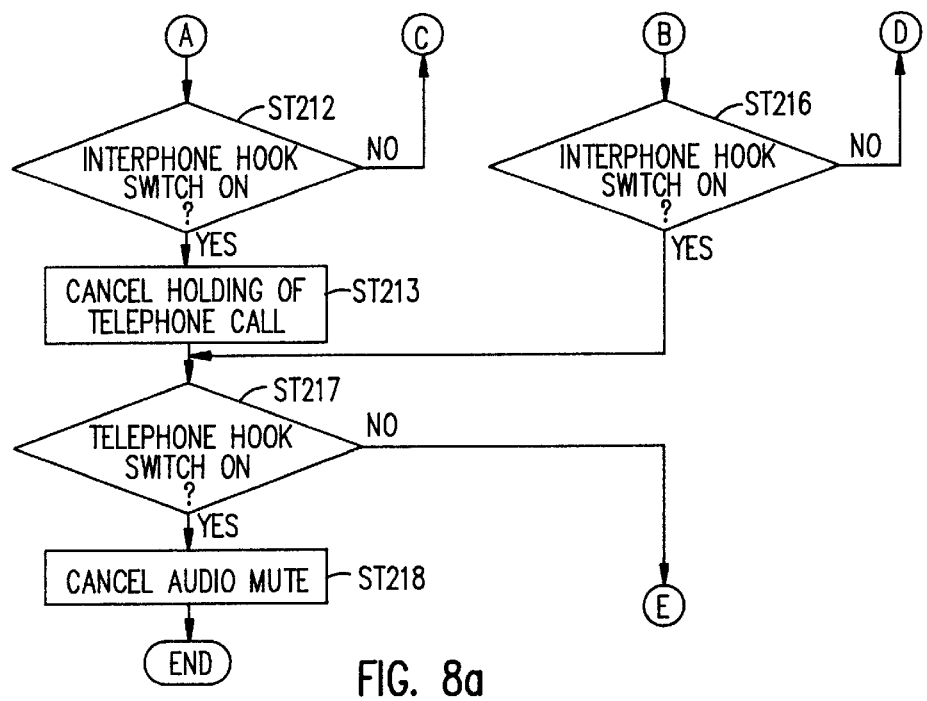
Figure 9:
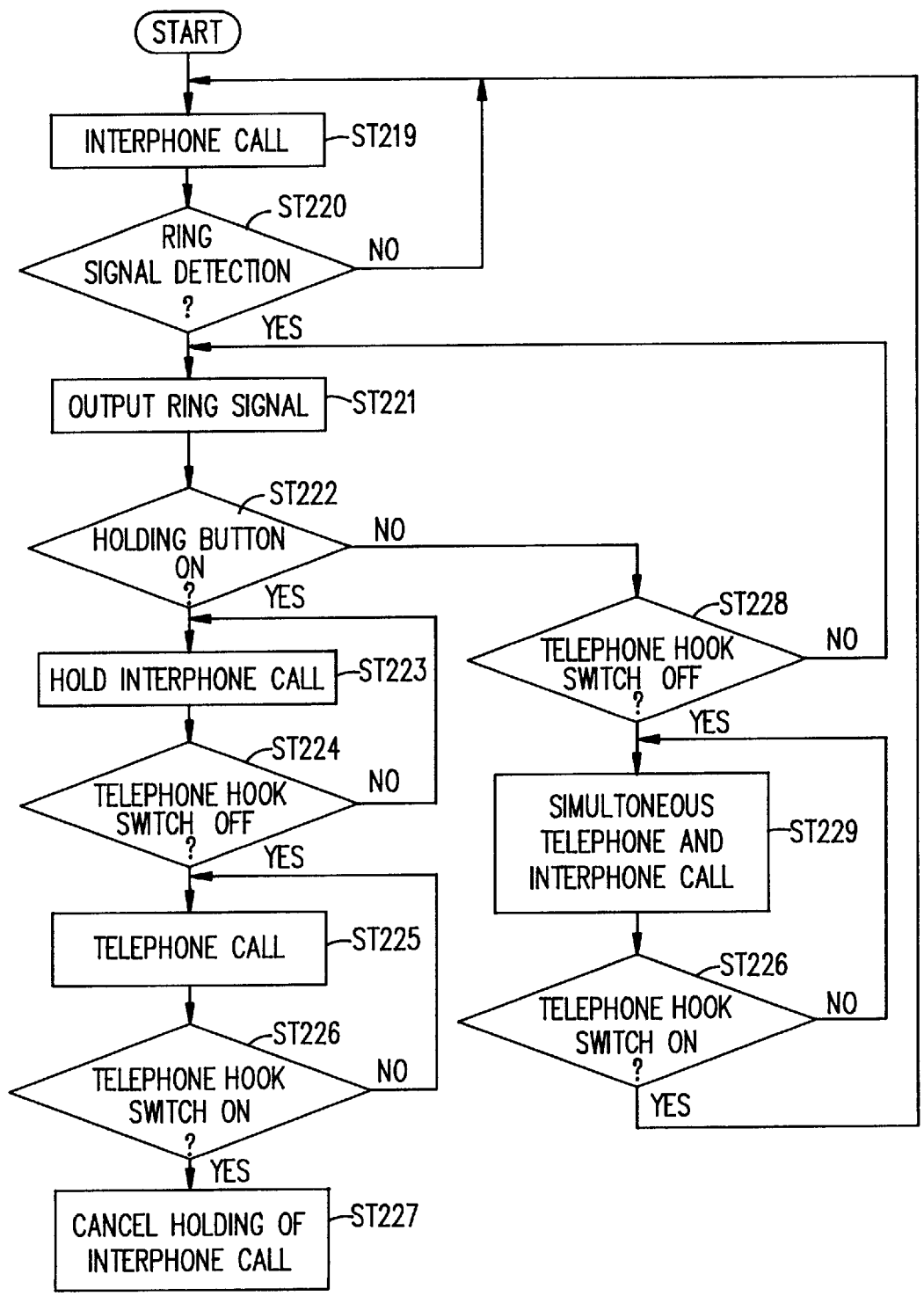

The multi-function audio system and method for controlling the same according to another embodiment of the present invention is explained below in detail with reference to FIGS. 7, 8 and 9. Left output L from audio circuit 200 is coupled to fixed contact point 231a of first switch 231, and right output R is coupled to fixed contact point 232a of second switch 232. The output of switching circuit 210 is connected to fixed contact points 231b and 232b of first and second switches 231 and 232 of switching section 230, and variable contact points 231c and 232c of first and second switches 231 and 232 are variably connected to their fixed contact points 231a, 231b, 232a and 232b according to a control signal CTL1 generated from controlling section 250.

The output of interphone circuit 220 is connected to fixed contact point 234b of fourth switch 234 of switching section 130, and one port of third switch 233 and fixed contact point 234a are respectively connected to variable contact points 231c and 232c of first and second switches 231 an 232. The other port of third switch 233 and variable contact point of fourth switch 234 are respectively to left and right speakers 270 and 270', and third switch 233 is on or off according to a control signal CTL2 supplied from controlling section 250. Variable contact point 234c of fourth switch 234 is variably connected to its fixed contact points 234a and 234b according to a control signal CTL3 supplied from interphone circuit 220.

Under the contact point connection state of switching section 230 as above, when variable contact points 231c and 232c of first and second switches 231 and 232 are respectively connected to their fixed contact points 231a and 232a, third switch 233 is on, and variable contact point 234c of fourth switch 234 is connected to its fixed contact point 234a, left and right outputs L and R of audio circuit 200 are outputted through left and right speakers 270 and 270' according to the contact point connection state of switching section 230. This contact point connection state of switching section 230 is maintained in normal condition to give priority to the output of audio circuit 200.

When the telephone rings while the user is hearing the audio through audio[]circuit 200, speaking circuit 210 receives the ring signal and outputs it. Ring signal detecting section 240 detects the ring signal and sends a signal corresponding to the detected ring signal to controlling section 250. Controlling section 250, when the ring signal is detected by ring signal detecting section 240, outputs control signal CTL1 to switch the contact point connection state, so as to couple variable contact point 231c of first switch 231 of switching section 230 to its fixed contact point 231b, and to couple variable contact point 232c of second switch 232 to its fixed contact point 232b. Here, third switch 233 is maintained in on state, and variable contact point 234c of fourth switch 234 is connected to its fixed contact point 234b.

By doing so, the output of audio circuit 200 is temporarily in mute state according to the switching of first and second switches 231 and 232, and the ring signal outputted from speaking circuit 210 is supplied to speakers 270 and 270' through switching section 230 (ST200, ST201, ST202, ST203). When the user applies a key command through key input section 260 to simultaneously hear the outputs of audio circuit 200 and speaking circuit 210, controlling section 250 receives the key command, and outputs control signal CTL1 to connect variable contact point 231c of first switch 231 of switching section 230 to its fixed contact point 231a, thereby outputting the audio signal of audio circuit 200 to left speaker 270 and outputting the telephone voice to right speaker 270'.

When the user hears the ring signal and makes the hook switch of key input section 260 off to answer the phone, the telephone call is connected, to allow the user to speak through speakers 270 and 270' and microphone 20 (ST204, ST205). After this, the user makes the hook switch on to finish the call, controlling section 250 outputs control signal CTL1 to control the contact point connection state of the switching section, so as to connect variable contact points 231c and 232c of first and second switches 231 and 232 of switching section 230 to their fixed contact points 231a and 232a, respectively. That is, the mute state of audio circuit 200 is released. Accordingly, the user can continuously listen to the audio signal of audio circuit 200, previously being heard, after finishing of the call (ST217, ST218).

Meanwhile, when a quest pushes interphone button 21 while the user is on the phone, interphone circuit 220 generates control signal CTL3 to connect fixed contact point 234c of fourth switch 234 to its variable contact point 234b, so as to respectively output the telephone voice and interphone bell sound through left speaker 270 and right speaker 270' (ST206, ST207). When the user presses the holding button of key input section 260 in order to hold the telephone call and answers the interphone, on hearing the interphone call sound, controlling section 250 generates control signal CTL2 to make third switch 233 on, thereby holding the telephone call (ST208, ST209).

When the user make the interphone hook switch off by the way of key input section 260, interphone circuit 220 switches variable contact point 234c of fourth switch 234 to fixed contact point 234b, to allow the user to speak trough the interphone (ST210, ST211). When the user makes the hook switch on through key input section 260 to complete the interphone call, interphone circuit 220 switches variable contact point 234c of fourth switch 234 to fixed contact point 234a, to complete the interphone call, and controlling section 250 makes third switch 233 on according to its control signal CTL2, so as to cancel the holding state of the telephone call (ST212, ST213).

When the user makes the hook switch on to finish the telephone call, controlling section 250 generates control signal CTL1 to switch variable contact points 231c and 232c of first and second switches 231 and 232 to their fixed contact points 231a and 232a respectively, thereby finishing the telephone call and releasing the mute state of audio system (ST217, ST218). If the user directly makes the hook switch off through key input section 260 without pushing the telephone holding button while the interphone call sound generates, variable contact point 234c of fourth switch 234 of switching section 230 is switched to its fixed contact point 234b according to control signal CTL3 of interphone circuit 220, enabling the simultaneous telephone and interphone calls (ST215).

When the user makes the interphone hook switch on through key input section 260 in order to finish the interphone call, the interphone call is completed, and only telephone call is connected. For finishing the telephone call, when the telephone hook switch is on, controlling section 250 generates control signal CTL1 to switch variable contact points 231c and 232c of first and second switches 231 and 232 to their fixed contact points 231a and 232a respectively, so as to finish the telephone call and release the mute state of audio system (ST217, ST218).

It will be described a case in which the telephone rings while the user is on the interphone call. When the telephone rings and the ring signal is detected by ring signal detecting section 240 while the user is on the interphone call, controlling section 250 generates control signal CTL1 to switch variable contact points 231c and 232c of first and second switches 231 and 232 of switching section 230 to their fixed contact points 231b and 232b respectively, and generates control signal CTL2 to make third switch 233 on. By doing so, the ring signal is outputted to speaker 270, and interphone call is made through speaker 270'.

When the user pushes the interphone holding button of key input section 260 in order to hold the interphone call and answer the telephone, on hearing the ring signal, controlling section 250 makes the interphone hook switch on, and thus interphone circuit 220 generates control signal CTL3 to switch variable contact point 234c of fourth switch 234 to its fixed contact point 234a. That is, the interphone call is in holding state (ST222, ST223), and only telephone call is connected (ST225).

When the user makes the telephone hook switch on through key input section 260 in order to finish the telephone call, controlling section 250 generates control signal CTL2 to make third switch 233 off, and interphone circuit 220 generates control signal CTL3 to switch variable contact point 234c of fourth switch 234 to its fixed contact point 234b, cancelling the holding state of the interphone call (ST206, ST207)

If the user directly makes the telephone hook switch off through key input section 260 without pushing the interphone holding button while the telephone ring signal is being outputted, controlling section 250 generates control signal CTL2 to make third switch 233 on, and interphone circuit 220 generates control signal CTL3 to switch variable contact point 234c of fourth switch 234 to its fixed contact point 234b. By doing so, the user can be simultaneously connected to the interphone and telephone calls (ST208, ST209). Thereafter, when the telephone hook switch is on, controlling section 250 generates control signal CTL2 to make third switch 233 off, allowing only interphone call (ST300, ST219).

Figure 10:
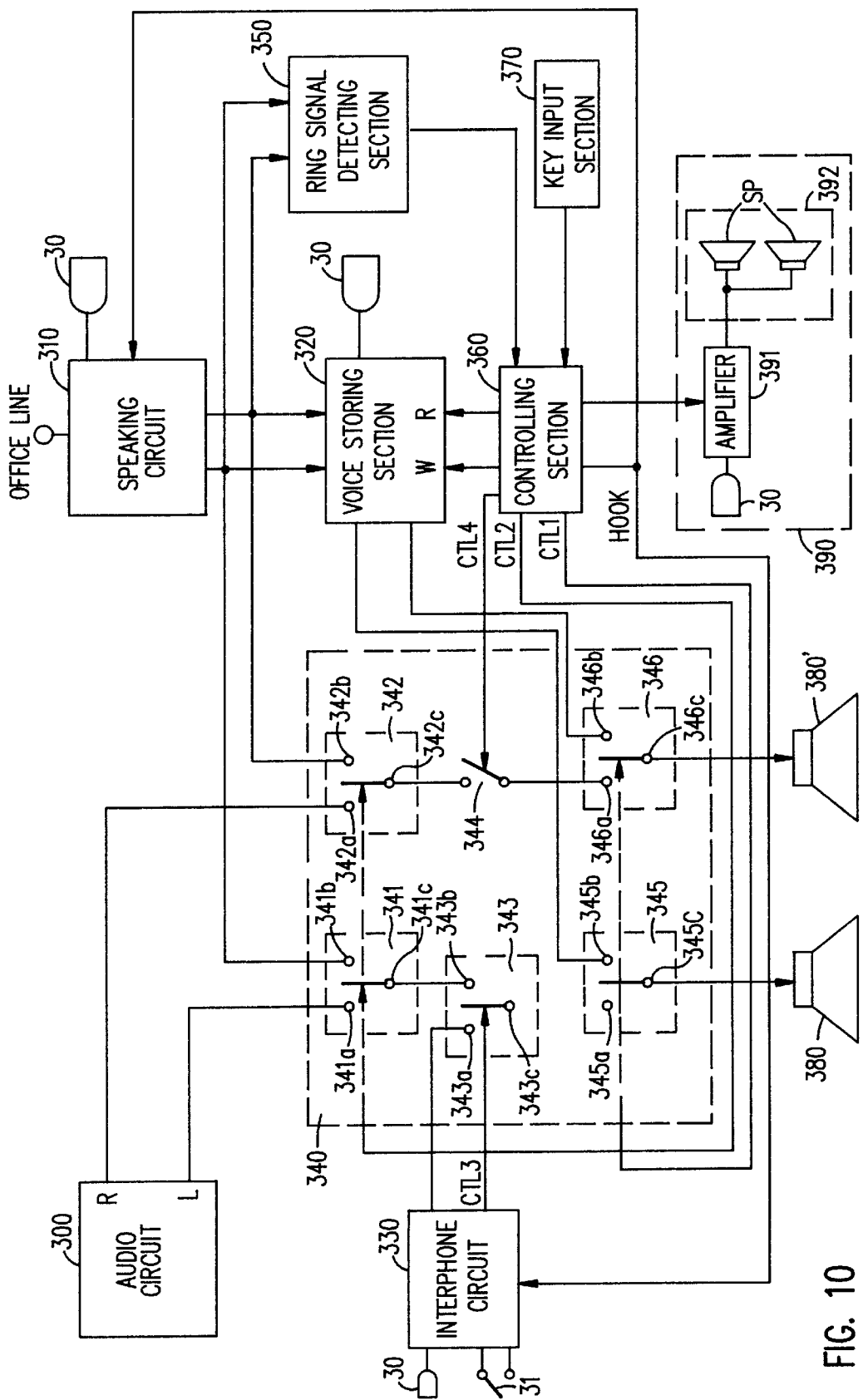
FIG. 10 is a block diagram of a circuit according to another embodiment of the present invention.

A multi-function audio system according to another embodiment of the present invention, as shown in FIG. 10, includes: a digital clock which has an alarm function and displays the current time; an audio circuit 300 for outputting the current audio signal to speakers 380 and 380' according to the switching state of a switching section 340; a speaking circuit 310 for outputting a ring signal through speakers 380 and 380' according to the switching state of switching section 340 under the control of a controlling section 360, and connecting the telephone call when a user wants to speak; a voice storing section 320 for storing a telephone conversation and voice message under the control of controlling section 360, and outputting the stored one when playback of the stored one is requested; an interphone circuit 330 for outputting a call sound through speakers 380 and 380' according to the switching state of switching section 340 under the control of controlling section 360, and connecting the interphone call when the user want to speak; switching section 340 whose switching state is varied according to the control of controlling section 360, to supply the output of audio circuit 300, speaking circuit 310, voice storing section 320 and interphone circuit 330 to speaker 380 and 380'; a ring signal detecting section 350 for detecting the ring signal supplied from speaking circuit 310; controlling section 360 for receiving the signal detected by ring signal detecting section 350, controlling the switching of switching section 340 to output the ring signal received from speaking circuit 310 to speakers 380 and 380', and controlling the switching state of switching section 340 according to a key command supplied from a key input section 370; and an indoor broadcasting service section 390 enabled by controlling section 360 to output the user's voice through one or more speaker SP located in the house.

The fundamental operation of this audio system can be easily understood by the above embodiments of the present invention. Thus, the operation is explained below, placing the focus on the switching state of switching section 340. First of all, when the user is listening to the audio system, variable contact point 341c of first switch 341 of switching section 340 is connected to its fixed contact point 341a, variable contact point 343c of third switch 343 is connected to its fixed contact point 343b, variable contact point 345c of fifth switch 345 is connected to its fixed contact point 345a, variable contact point 342c of second switch 342 is connected to its fixed contact point 342a, fourth switch 343 is on, and variable contact point 346c of sixth switch 346 is connected to its fixed contact point 346a, so as to allow the audio signal to be outputted through speakers 380 and 380'.

When the telephone rings while the user is hearing the audio system, variable contact points 341c and 342c of first and second switches 341 and 342 are switched to their fixed contact points 341b and 342b respectively, according to control signal CTL2 of controlling section 360. When an interphone call button 31 is pushed while the user is hearing the audio system, variable contact point 343c of third switch 343 of switching section 340 is switched to its fixed contact point 343a, to output the interphone call sound to speaker 380, and output the audio signal of audio circuit 300 to speaker 380'. Here, when the user want to mute the audio system, fourth switch 344 is off according to a control signal CTL4 of controlling section 370.

When the message stored in voice storing section 320 is played back, variable contact points 345c and 346c of fifth and sixth switches 345 and 346 are connected to their contact points 345b and 346b respectively, according to control signal CTL1, to allow the stored voice to be outputted through speakers 380 and 380'. When the telephone rings while the voice stored in voice storing section 320 is played back, variable contact point 341c of first switch 341 is connected to its fixed contact point 341b, variable contact point 343c of third switch 343 is connected to its fixed contact point 343b, variable contact point 345c of fifth switch 345 is connected to its fixed contact point 345a, variable contact point 342c of second switch 342 is connected to its fixed contact point 342b, fourth switch 343 is on, and variable contact point 346c of sixth switch 346 is connected to its fixed contact point 346a, according to control signals CTL1, CTL2, CTL3 and CTL4, to allow the user to speak over the phone through speakers 380 and 380'.

When the interphone is called while the voice is played back, variable contact point 343c of third switch 343 is connected to its fixed contact point 343a, third switch 343 is off according to control signal CTL4, and variable contact point 356c of sixth switch 346 is connected to its fixed contact point 346a according to control signal CTL2, to allow the interphone call to be made.

Meantime, the audio system has the indoor broadcasting function. When the user pushes an indoor broadcasting button of key input section 370, controlling section 360 enables an amplifier 391 of indoor broadcasting section 390. Then, the user's voice received from a microphone 30 is amplified by amplifier 391 to a predetermined level, and then applied to speaker 392. Speaker 392 is composed of one or more speaker and located in various places in the house, for example, bedrooms, living room, bathroom and upstairs. The user's voice amplified by amplifier 391 is outputted through speaker 392. Accordingly, the user's voice message is clearly transmitted to the family in the house even if the user does not speak loudly.

Figure 11:
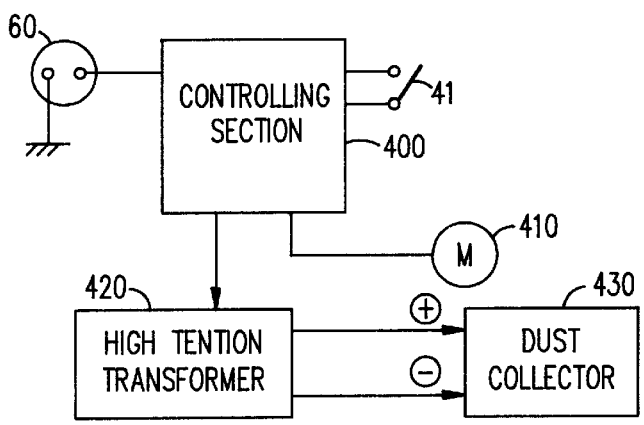
FIG. 11 is a diagram illustrating the inner circuit of an air cleaner applied to the present invention.
Figure 12:
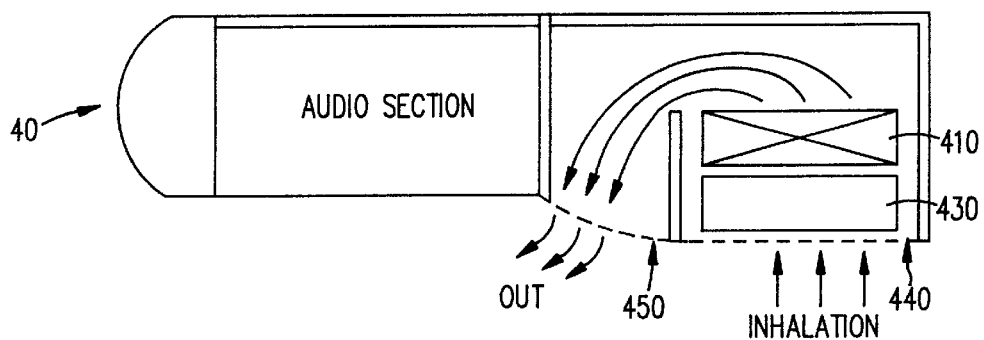
FIG. 12 is a diagram for explaining the structure of the air cleaner applied to the present invention.

The multi-function audio system of the present invention further includes an air cleaner for cleaning the air in the house. That is, the air cleaner for removing particles and smell in the air is included in the multi-function audio system attachable to the furniture located in the house. This is explained below in detail with reference to the attached drawings. Referring to FIG. 12, an audio section having multiple functions is located on front panel 40 of the audio system, and the air cleaner is attached to the rear of the audio system. The operation of the air cleaner is described below with reference to FIG. 11.

When the user makes a switch 41 on, to use the air cleaning function, a controlling section 400 judges an air pollution level sensed by a pollution sensor 60. Controlling section 400 classifies the air pollution level into three grades, and controls the rotary power of a fan motor 410 to adjust the inhalation amount of air according to the pollution grade. Simultaneously, controlling section 400 operates a high-tension transformer 420 to apply a high voltage of approximately 6000V to a dust collector 430. Accordingly, as shown in FIG. 12, polluted air is inhaled through an inhalation hole 440 located in the bottom of the audio system according to the rotary power of fan motor 410, and passes through dust collector 430, so that particles and smell in the air are removed. Thereafter, clean air and anion are exhausted through an outlet 450 located on the front of the audio system according to the jetting power of fan 410. When the air sensed by pollution sensor 40 is clear, controlling section 400 stops the operation of fan motor 410 and high-tension transformer 420, ceasing the air cleaning function. Accordingly, it is possible to easily remove food smell and bad smell generated when the user works in the kitchen.

As described above, the audio system of the present invention includes the digital clock, audio, telephone, interphone, voice recording, indoor broadcasting and air cleaning functions. Accordingly, the user can relieve the tedium of housekeeping labor by listening to the audio system, and make the telephone call and interphone call while at work without moving to the telephone and interphone. Furthermore, the user can directly record the telephone conversation while he or she is on the phone, and record a voice message to be transmitted to the family when he or she goes out. Also, the user can call the family in the house using the indoor broadcasting function. Moreover, it is possible to clean the polluted air and the various smell generated in the kitchen.

It will be apparent to those skilled in the art that various modifications and variations can be made in the multi-function audio system and method for controlling the same of the present invention without departing from the spirit or scope of the invention. Thus, it is intended that the present invention cover the modifications and variations of this invention provided they come within the scope of the appended claims and their equivalents.

What is claimed is:

1. A multi-function audio system, comprising:
   a digital clock which has an alarm function and displays the current time;
   an audio circuit for outputting the current audio signal to a speaker, according to a switching state of a switching section;
   a speaking circuit for outputting a ring signal through the speaker according to a switching state of the switching section under the control of a controlling section, and connecting a telephone call when a user wants to speak;
   an interphone circuit for controlling the switching state of the switching section to output a bell signal through the speaker when an interphone call button is pushed, and connecting an interphone call to a caller when the user wants to speak; and
   a ring signal detecting section for detecting a ring signal supplied from the speaking circuit;
   wherein the switching section varies its switching state under the control of the controlling section, to supply the output of the audio circuit, speaking circuit and interphone circuit to the speaker; and
   the controlling section receives the signal detected by the ring signal detecting section, controls the switching of the switching section to output the ring signal applied from the speaking circuit to the speaker, and controls the switching state of the switching section according to a key command supplied from a key input section.

2. The system as claimed in claim 1, wherein the controlling section changes the contact point connection state of the switching section, to connect the output of the audio circuit to the speaker, when the telephone call is completed.

3. The system as claimed in claim 1, wherein the interphone circuit changes the contact point connection state of the switching section, to output the output of the audio circuit to the speaker, when the interphone call is completed.

4. The system as claimed in claim 1, wherein the controlling section selectively mutes the output of the audio circuit.

5. The system as claimed in claim 1, wherein the controlling section selectively holds the output of the speaking circuit.

6. A multi-function audio system, comprising:
   a digital clock which has an alarm function and displays the current time;
   an audio circuit for outputting the current audio signal to a speaker, according to a switching state of a switching section;
   a speaking circuit for outputting a ring signal through the speaker according to a switching state of the switching section under the control of a controlling section, and connecting a telephone call when a user wants to speak;
   a voice storing section for storing a telephone conversation and voice message under the control of the controlling section, and outputting the stored one when the user wants to play back it;
   an interphone circuit for outputting a call sound through the speaker according to a switching state of the switching section under the control of the controlling section, and connecting an interphone call to a caller when the user wants to speak; and
   a ring signal detecting section for detecting a ring signal supplied from the speaking circuit;
   wherein the switching section varies its switching state under the control of the controlling section, to supply the output of the audio circuit, speaking circuit and interphone circuit to the speaker; and
   the controlling section receives the signal detected by the ring signal detecting section, controls the switching of the switching section to output the ring signal applied from the speaking circuit to the speaker, and controls the switching state of the switching section according to a key command supplied from a key input section.

7. The system as claimed in claim 6, wherein the controlling section changes the contact point connection state of the switching section, to connect the output of the audio circuit to the speaker, when the telephone call is completed.

8. The system as claimed in claim 6, wherein the interphone circuit changes the contact point connection state of the switching section, to output the output of the audio circuit to the speaker, when the interphone call is completed.

9. The system as claimed in claim 6, wherein the controlling section changes the switching state of the switching section to connect the output of the audio circuit to the speaker when playback of the voice message stored in the voice storing section is completed.

10. The system as claimed in claim 6, wherein the controlling section selectively mutes the output of the audio circuit.

11. The system as claimed in claim 6, wherein the controlling section selectively holds the output of the speaking circuit.

12. The system as claimed in claim 6, further comprising an indoor broadcasting section which is enabled by the controlling section, to output a user's voice through one or more speaker, the speaker being located in a house.

13. A multi-function audio system as in claim 1 or claim 6 attachable to the furniture located in a house, comprising an air cleaner for removing particles and smells in the air.

* * * * *